United States Patent Office 3,540,902
Patented Nov. 17, 1970

3,540,902
REFRACTORY MATERIALS
John Kington Groves, Birmingham, England, assignor to Foseco International Limited, Birmingham, England, a British company
No Drawing. Filed Sept. 18, 1967, Ser. No. 668,659
Claims priority, application Great Britain, Sept. 28, 1966, 43,293/66, Patent 1,165,363
Int. Cl. C04b $35/16$
U.S. Cl. 106—66     6 Claims

ABSTRACT OF THE DISCLOSURE

Low quality refractory materials, such as perlite, may be upgraded by treatment with a refractory metal oxide, such as aluminium, chromium or magnesium oxide.

This invention relates to refractory compositions particularly refractory compositions containing perlite.

In many applications in the foundry industry, refractory heat-insulating materials are used. For example, shapes and slabs of such material are extensively used to line hot tops or the heads of ingot moulds, and as insulating riser sleeves in metal casting operations.

In these applications, the use to which some refractories, particularly perlite may be put is greatly limited, due to their unsuitability at temperatures of 800° C. or greater. In low temperature applications, such as the casting of aluminium (about 750° C.) suitable mixtures of about 10% ball clay, 10% sulphite lye and about 80% perlite give satisfactory results, but such compositions are of little use, for example, in casting copper.

In order to increase the usefulness of perlite, which generally consists of about 75% $SiO_2$, 14% $Al_2O_3$ and 11% other oxides, and of similar refractory materials of low refractoriness, at higher temperatures, it is necessary to increase their refractoriness.

According to the present invention there is provided a method for increasing the refractoriness of refractory siliceous materials which comprises dispersing therein a refractory metal oxide.

The refractory metal oxide is preferably chromium oxide, though aluminium oxide and magnesium oxide may also be used.

The refractory metal oxide may be deposited in or on the siliceous material as such or may be deposited in situ by firing at low temperature, preferably 600–700° C., a siliceous refractory in which is dispersed a material which under the heat of such firing process generates or is converted into a refractory metal oxide. Refractory compositions prepared according to the process of the present invention may be used as a constituent of riser sleeves which are suitable for copper casting at about 1100° C.

Three principal methods may be employed for the addition of chromic oxide:

(a) Sorption of $CrO_3$ from solution and its subsequent conversion to $Cr_2O_3$ by firing at approximately 600° C.

(b) Sorption of ammonium dichromate or ammonium chromate from solution and subsequent conversion to $Cr_2O_3$ by firing.

(c) Sorption of chromium cations from a suitable salt followed by a pH increase to effect precipitation of hydrated chromium oxide (chromium-hydroxide) and subsequent firing.

The perlite is preferably exposed to sorption of the chromium containing compound for 15–30 minutes. Shorter times do not give such an increase in refractoriness as the longer, but prolonged exposure results in no further increase. The solutiton is preferably at least 5% by weight concentration, and more preferably at least 10% or more, e.g. 40%.

Firing time of the thus treated perlite may be, for example, approximately 30 minutes, at about 700° C., and the treated perlite is preferably dried at about 110° C. prior to firing.

In order to test the refractoriness, samples of treated and untreated perlite were exposed in a muffle furnace at 1400° C. for one minute. Untreated perlite sintered, but this tendency decreased rapidly with increasing refractory oxide concentration. Samples which had been treated with solutions of greater than 10% concentration showed no tendency to sinter.

For the absorption of aluminium oxide the following two methods may be used:

(1) Absorption of aluminium oxide by treatment with a solution of an aluminium salt (e.g. aluminum chloride) and subsequent precipitation of the hydroxide by treatment with ammonia before firing at approx. 1000° C.

(2) Formation of an aluminium alginate complex in ammonical solution which is absorbed onto the perlite and then heated to leave a coating of aluminium oxide.

When using the first of these methods, exposure times and solution concentrations are preferably the same as those given above in respect of chromic oxide. However, the preferred concentration range of the aluminium alginate complex is 1–5% by weight.

On testing perlite upgraded with aluminium oxide as above, similar results were obtained, save that treatment with only a 5% by weight solution of alginate complex eliminated the tendency to sinter.

The invention includes not only the method described above but refractory siliceous materials which have been upgraded by the method described.

The following examples will serve to illustrate the invention. In these examples, the modified refractory was heated up until a first contraction of the material on heating was observed. The higher the temperature of the first contraction, the higher is the refractoriness. The "first contraction" temperature of the unmodified perlite was 1205° C.

EXAMPLE 1

3 g. of perlite were immersed in 200 ml. of a 0.1 gm./ ml. solution of ammonium dichromate at room temperature for 15 minutes. A specimen of thus treated perlite was heated; first contraction occurred at 1295° C.

2 gm. of perlite were then treated similarly except that the temperature of the dichromate solutttion was 80° C. First contraction was observed at 1360° C.

It was found also that the higher the concentration of the treatment solution, the higher (for a given immersion time and temperature) was the "first contraction" temperature.

EXAMPLE 2

3 g. samples of perlite were immersed for 10 minutes at room temperature in aluminium chloride solutions of given concentrations, and then each immersed for 5 minutes in 100 ml. of 10% aqueous ammonia. The samples were then heated and their first contraction temperatures noted. The samples were then heated and their first contraction temperatures noted. The results were as follows:

| Concentration of aluminium chloride solution (gm./100 ml.) | First contraction temperature (° C.) |
|---|---|
| 2.5 | 1340 |
| 5 | 1310 |
| 10 | 1380 |
| 15 | 1400 |

I claim as my invention:

1. In a method of increasing the refractoriness of perlite the steps of immersing perlite for at least 15 minutes in a solution containing a metal compound selected from the group consisting of chromium, aluminium and magnesium compounds whereby the metal compound is dispersed in the perlite, and subsequently heating the perlite thereby to convert the compound dispersed therein to the corresponding metal oxide.

2. A method according to claim 1 wherein the metal compound is a chromium compound and the perlite is subsequently heated at a temperature of approximately 600° C.

3. A method according to claim 1 wherein the metal compound is selected from the group consisting of ammonium dichromate and ammonium chromate.

4. A method according to claim 2 including the step of increasing the pH of said solution to effect precipitation of chromium hydroxide before firing the material.

5. A method according to claim 1 wherein the metal compound is an aluminium salt which is subsequently treated with ammonia to precipitate aluminium hydroxide before firing the perlite at approximately 1000° C.

6. A method according to claim 1 wherein the metal compound is an aluminium alginate complex in ammoniacal solution.

References Cited
UNITED STATES PATENTS

| | | | |
|---|---|---|---|
| 2,805,174 | 9/1957 | Veale | 106—69 |
| 2,977,240 | 3/1961 | Houston. | |
| 3,236,665 | 2/1966 | King | 106—69 |

JAMES E. POER, Primary Examiner

U.S. Cl. X.R.

106—58, 65, 288